United States Patent
Greene et al.

[11] Patent Number: 5,903,328
[45] Date of Patent: May 11, 1999

[54] TILED FLAT-PANEL DISPLAY WITH TILE EDGES CUT AT AN ANGLE AND TILES VERTICALLY SHIFTED

[75] Inventors: Raymond G. Greene, Ovid; Dean W. Skinner, Vestal, both of N.Y.

[73] Assignee: Rainbow Displays, Inc., Endicott, N.Y.

[21] Appl. No.: 08/876,472

[22] Filed: Jun. 16, 1997

[51] Int. Cl.$^6$ .................................................. G02F 1/133
[52] U.S. Cl. .......................... 349/73; 349/187; 345/903; 345/1; 156/304.1
[58] Field of Search .......................... 349/73, 187; 345/1, 345/2, 3, 4, 903; 156/304.1, 304.5

[56] References Cited

U.S. PATENT DOCUMENTS

| | | | |
|---|---|---|---|
| 5,056,893 | 10/1991 | Holz et al. | 349/73 |
| 5,661,531 | 8/1997 | Greene et al. | 349/73 |
| 5,673,091 | 9/1997 | Boisdron et al. | 349/73 |
| 5,677,784 | 10/1997 | Harris | 359/250 |
| 5,748,268 | 5/1998 | Kalmanash | 349/47 |

*Primary Examiner*—William L. Sikes
*Assistant Examiner*—Kenneth Parker
*Attorney, Agent, or Firm*—Salzman & Levy

[57] ABSTRACT

The present invention is a tiled, seamless-type, flat-panel display with improved light efficiency. The display consists of tiles that are bonded together during assembly with an index-matching adhesive, as is commonly known in the art. Prior to bonding the tiles, however, their adjoining edges are cut at an angle. The pixel pitch or aperture spacing of the display is maintained in the horizontal direction, while the tiles are vertically shifted. The distance from the center of the pixel nearest the edge to the cut in the aperture mask is made greater than one-half of a pixel. When viewed from above, the aperture mask is continuous. The overlapping edges of the tile cuts are positioned between the apertures, so as to better conceal the edges. The resulting display configuration produces an approximate doubling of the space available for sealing the tiles and allows the increasing of the aperture size of each pixel edge, using the same, minimum gap between adjacent tiles, allowing for increased pixel density (resolution). Continuous polarizer sheets are applied to the tile assembly during bonding, thereby eliminating the possibility of producing visual tile seam defects due to individual tile polarizer defects. Additionally, tri-color pixel designs are employed to maintain the color purity of the tiles in the display.

27 Claims, 6 Drawing Sheets

Figure 4A
Color Shift due to misrepresentation

*Figure 4B*
Color Balanced Pixel

Red Area = Blue = Green

*Figure 4C*
Ideal Color ("white") Balanced Pixel

*Figure 4D*
Alternate Pixel Designs

TILED FLAT-PANEL DISPLAY WITH TILE EDGES CUT AT AN ANGLE AND TILES VERTICALLY SHIFTED

FIELD OF THE INVENTION

The present invention pertains to the design of tiled, seamless, flat-panel displays and, more particularly, to both a method of fabrication, and an article fabricated thereby, the tiled, flat-panel display having a monolithic, seamless appearance, improved light efficiency, and improved color purity.

BACKGROUND OF THE INVENTION

Flat-panel displays made in accordance with known liquid-crystal display (LCD) technologies are both limited in size and expensive to manufacture. Both the limitations and the high cost arise from the low processing yields as the display increases in area. Inexpensive, larger displays can be made from assembling smaller display "tiles", but such a resultant, larger display reveals the seams between the tiles. Concealing the tile seams, so that the assembled, large display looks like a continuous, one-piece unit, is a problem.

One method of making tiled displays is to assemble four tiles in a plane, using an epoxy sealant along the adjacent seams. It should be noted that even using this construction there may be a slight vertical misregistration in the aperture masking between tiles. This is due to inherent variations in the materials, components, and processes used to manufacture LCDs.

This type of construction is shown in copending U.S. patent application, Ser. No. 08/652,032 (filed on May 21, 1996), entitled "Construction and Sealing of Tiled, Flat-Panel Displays". This method of construction consists of assembling LCD tiles in a planar fashion, by locating the appropriate fiducials disposed on each tile. The tiles are attached to cover and back plates with a refractive, index-matched adhesive. Prior to assembly, the adjacent tile edges are finished so that their final position in the assembly will provide a seamless appearance.

The pixel closest to the finished edge must remain intact. These design tolerance requirements result in processing limitations for making narrow seals, edge finishing, and assembly positioning. The allowable spatial tolerances for these operations or processes may result in an aperture ratio too small for a practical tiled display without novel designs, processes, and assembly procedure.

The present invention complements the processing methods and designs with the aforementioned construction, while maintaining the advantages of the imperceptibly visible seams of the display.

In addition, the current invention provides a method of fabricating a low-cost, seamless type of display that has superior light efficiency, increased pixel density, improved color purity and ease of assembly.

It is an object of this invention to provide an improved, seamless, flat-panel display.

It is a further object of this invention to provide a flat-panel, seamless display that has superior light efficiency.

It is another object of this invention to provide a method of fabricating an inexpensive, seamless, flat-panel display.

It is another object of this invention to provide for increased pixel density, or resolution, in a tiled, flat-panel display.

It is another object of this invention to provide pixel designs for improved color purity of seamless, tiled, flat-panel displays.

It is another object of this invention to provide a design for a seamless, tiled, flat-panel displays with continuous, or monolithic polarizers.

SUMMARY OF THE INVENTION

In accordance with the present invention, there is provided a tiled, seamless type of flat-panel display having improved light efficiency, increased pixel density and improved color purity. The display comprises tiles that are bonded together between continuous polarizers during assembly with an index-matching low elastic modulus adhesive. Prior to bonding the tiles, however, their edges are cut at an angle. The pixel or aperture spacing of the display is maintained in the horizontal direction, while the tiles are vertically shifted. The distance from the center of the pixel nearest the edge to the cut in the aperture mask is made greater than one-half pixel. When viewed from above, the aperture mask is continuous. The finished edges of the tiles are positioned between the apertures, so as to better conceal the edges. The resulting tile arrangement is positioned between two continuous polarizer sheets during bonding. The resulting display configuration produces an approximate doubling of the space available for sealing each of the tiles and/or allows for increasing the aperture opening of each pixel, using the same, minimum gap between adjacent tiles. The geometry of the vertical shift and the overlap of the tiles is such that the viewing angle, the aperture ratio and the process yields can all be optimized. Alternatively, higher pixel densities may be fabricated with this method as well. Thin spacers, or adhesive layers, can be added to the tiles prior to assembly, so that the tiles can be nested during the assembly process.

Another embodiment of the inventive fabrication method includes alternately changing the tile's top glass thickness so that the top surface of all tiles are coplanar. The advantages of utilizing this form of display construction include, but are not limited to, the possible elimination of the need for exterior masks; reduced demand for collimated lighting; relaxed tolerances during assembly; increased production yields; use of continuous polarizer sheets; having a wider seal region for the same pixel pitch; realizing an improved concealment of the seams; achieving a more light-efficient display; and possessing greater design flexibility.

A further embodiment of this invention is the use of one-piece, continuous, full polarizer sheets during fabrication of the displays. The continuous polarizer provides an increased area for the tile seam. It further reduces the probability of defects appearing in the seam due to polarizer flaws, defects, and other optical artifacts. The application of continuous polarizer sheets in the display fabrication can be extended to conventional tiled displays as described in the aforementioned U.S. patent application, Ser. No. 08/652,032.

Another embodiment of this invention changes the geometric design of the color pixel elements such that the color purity of each tile's pixels does not significantly shift due to in-plane misalignment of the pixels. The misaligned pixels may be offset with respect to aperture masks (above or below the tiles in certain display configurations described herein). Such pixel designs include nested rectangular annuli of two primary colors surrounding a center rectangular third primary color; and, alternatively, pixels with two of the primary colors rectangularly-shaped and bounded on each side with smaller rectangularly-shaped elements of the third primary color.

BRIEF DESCRIPTION OF THE DRAWINGS

A complete understanding of the present invention may be obtained by reference to the accompanying drawings, when considered in conjunction with the subsequent, detailed description, in which.

For purposes of both clarity and brevity, like elements and components will bear the same designations and numbering throughout the figures.

DESCRIPTION OF THE PREFERRED EMBODIMENT

Generally speaking, the invention features a design and a method of fabrication, and an article made thereby, of a seamless, flat-panel display. The flat-panel display of this invention is constructed of liquid-crystal display (LCD) tiles that have been cut at a preferred angle; vertically shifted; horizontally aligned; and bonded together by using an adhesive having a matching index of refraction and having a low elastic modulus, say 50,000 psi typically. The edges of the tile cuts are positioned between the apertures, so as to overlap neighboring tile edges and conceal the edges. The ratio of the opening of the aperture to the pixel pitch is approximately double that of a standard, tiled flat-panel display, thus allowing more light to pass therethrough.

Figure 1A:
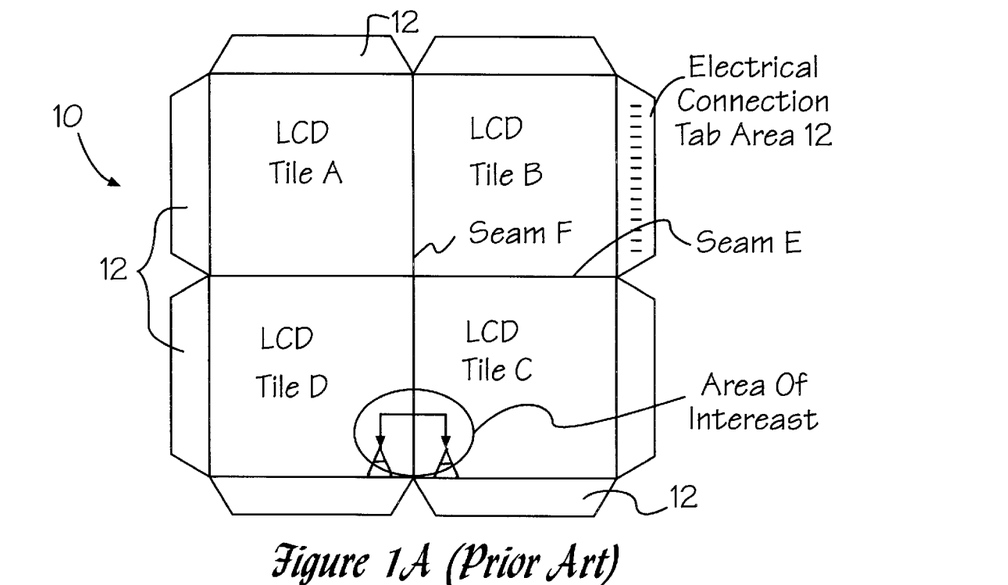
FIG. 1a illustrates a plan view of a tiled, flat-panel display constructed in accordance with techniques of the prior art.
Figure 1B:
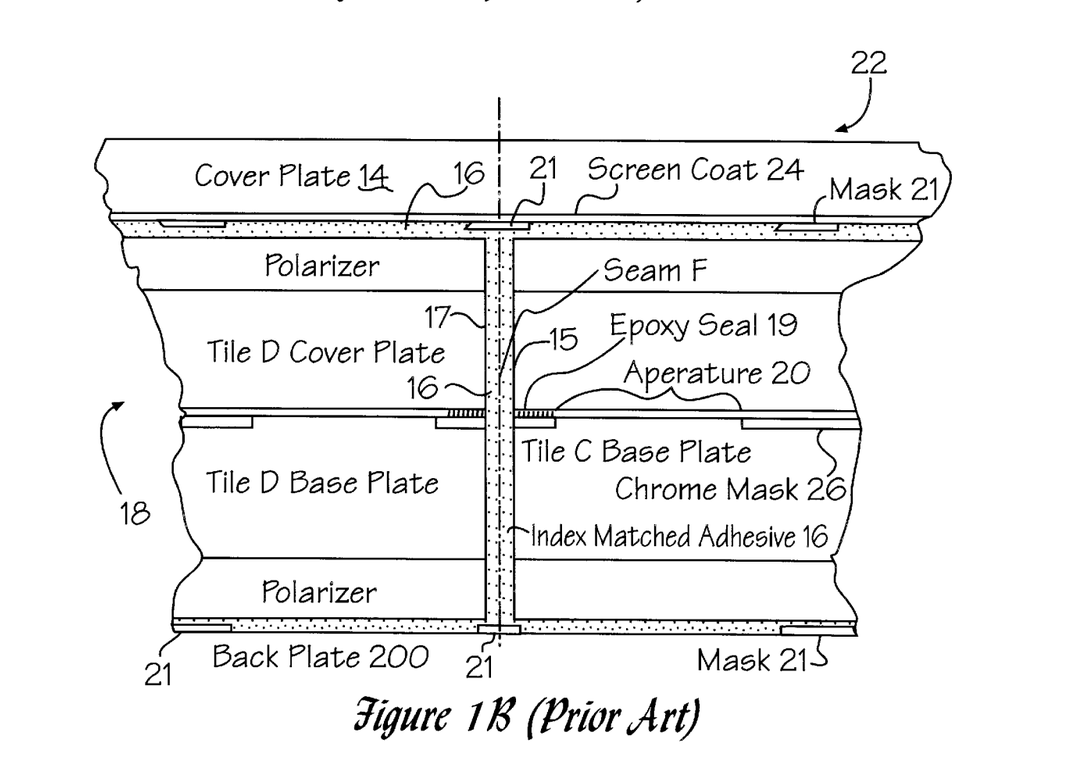
FIG. 1b depicts an enlarged, partial, sectional view of the tiled, flat-panel display shown in FIG. 1a, taken along lines A—A.

Now referring to FIGS. 1a and 1b, a construction of a tiled, flat-panel, LCD display 10 of the prior art is shown. The LCD tiles A, B, C and D, respectively, are bonded together in a plane along seams E and F, respectively, and to a cover plate 14 (FIG. 1b) by a thin, adhesive film 16 possessing the same index of refraction as the tiles. An electrical connection is made to the tiles through the electrical connection tab areas 12, as shown.

Referring more specifically to FIG. 1b, an enlarged view of the circled area of interest 18 (FIG. 1a) is illustrated. Prior to the assembly of the tiles, the adjacent edges 15 and 17 are accurately finished, so that their final position in the assembly provides a seamless appearance, as described in U.S. patent application, Ser. No. 08/593,759 (filed on Jan. 29, 1996), entitled "Tiled, Flat-Panel Display Having Invisible Seams". The pixels closest to the cut edges must remain intact, necessitating the use of a narrow, polymer tile seal 19, as shown. Such a construction requires tight tile edge tolerances, as well as a small pixel aperture 20. This construction of the prior art conceals the seam F by using collimated light, not shown, along with masks 21 that are on both sides of the assembly.

The collimated light requires a diffusion screen coating 24 on the viewing side 22, in order to recapture the viewing angle lost in collimation. The net result is that this method of concealing the seam F requires much more light to be delivered to the display assembly, than is needed by an untiled display.

The normal thickness tolerance of the glass used to make tiles is 0.1 mm. When tiles are assembled in an in-plane fashion, as depicted in FIG. 1b, a vertical misregistration in the chrome mask 26 of up to 0.2 mm can result. This, in turn, results in seams that are larger in vertical dimension and may be noticeable when viewed at off-normal angles.

The invention described herein does not necessarily require collimated light and masks to conceal the seam and, therefore, is significantly more light-efficient.

It is sometimes desirable to be able to use non-collimated light with the display. Non-collimated light is both easy to obtain and inexpensive. Moreover, the entire display will thus be efficient in its energy usage. There are inherent inefficiencies in the process of producing collimated light, particularly the level of collimation required for so-called seamless tiled displays. In addition, collimated light requires a screen coating to redistribute the light over predetermined desirable viewing angles, which significantly reduces head-on light intensity.

A tiled display will appear seamless when there is no noticeable gap in the internal chrome mask 26 at the juncture of two tiles. Additionally, the display will appear seamless when the edges of the cut tiles are not noticeable for any viewing angle within an acceptable range.

Figure 2:
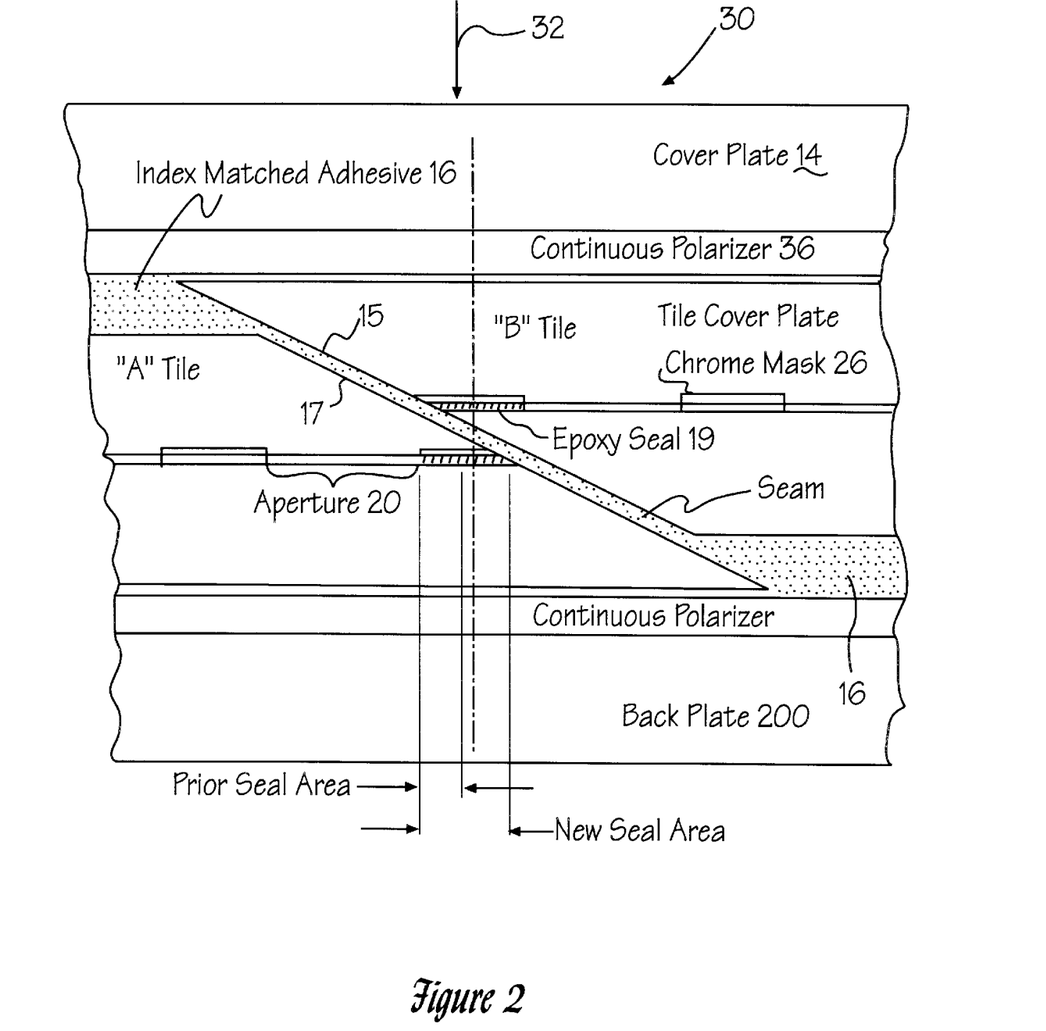
FIG. 2 illustrates a sectional view of the flat-panel display constructed in accordance with this invention.

Referring now to FIG. 2, the display construction 30 of this invention is depicted in vertical cross-section. The construction provides for the aforementioned attributes in a practical manner, while providing tolerance relief regarding the critical geometry near the edges 15 and 17 of the respective LCD tiles A and B.

The cross-section of the display 30 has tiles A and B joined during assembly with an index-matching adhesive, having a low elastic modulus. Prior to bonding, however, the tile edges 15 and 17, respectively, are cut and finished on an angle, as shown. The joined tiles A and B are displaced vertically in such a fashion so as to provide the following attributes: (1) the pixel pitch (or aperture spacing) is maintained in the horizontal direction; (2) the distance from the center of the pixel nearest the edge to the cut in the chrome mask 26 is greater than one-half of the pixel pitch; (3) the chrome mask 26 is continuous, when viewed from above (arrow 32); and (4) the ends of the edges 15 and 17, respectively, of the tile cuts are positioned between apertures 20, so as to better conceal the edges and therefore the tile seams.

In one embodiment, assuming the tiles to be 1 mm thick, with the chrome mask 26 centrally located, and a 1 mm pixel pitch with a 0.6 mm aperture, the tiles A and B are cut so that the bevelled edges 15 and 17 are, respectively, two pixels wide (2 mm).

Referring again to FIG. 1b, a vertical cut provides a seal area width from an aperture edge to a cut edge of approximately 0.175 mm, allowing for a 0.05 mm gap between adjacent tiles.

The construction of the invention (FIG. 2) allows a distance of approximately 0.387 mm between the aperture edge and the tile edge, with a vertical shift of 0.2 mm between tiles A and B, while maintaining a 0.05 mm gap between adjacent tiles.

This more than doubles the space allowed to seal the tiles A and B, and permits the aperture 20 to increase, which, in turn, enables more light to pass therethrough. A "seam", or a hole in the mask is visible at an angle of 60 degrees off normal, resulting in a display having a 120 degree viewing angle, which is certainly acceptable.

The geometry of both vertical shift and overlap can be altered so as to optimize viewing angle, aperture ratio, process yields, etc.

The tiles are further bonded between two continuous polarizer sheets 36 during the assembly. These polarizer sheets 36 span the full width of the display in each direction. The sheets may be pre-bonded to a cover plate 14 and back plate 200 as shown in FIG. 2. Alternatively, the tiles can be bonded between polarizer sheets without a cover plate and back plate. Continuous polarizer sheets 36 eliminate seams in the polarizer material, which can be sites for defects that can become manifest in the display seam and render the display not "seamless".

Figure 3:
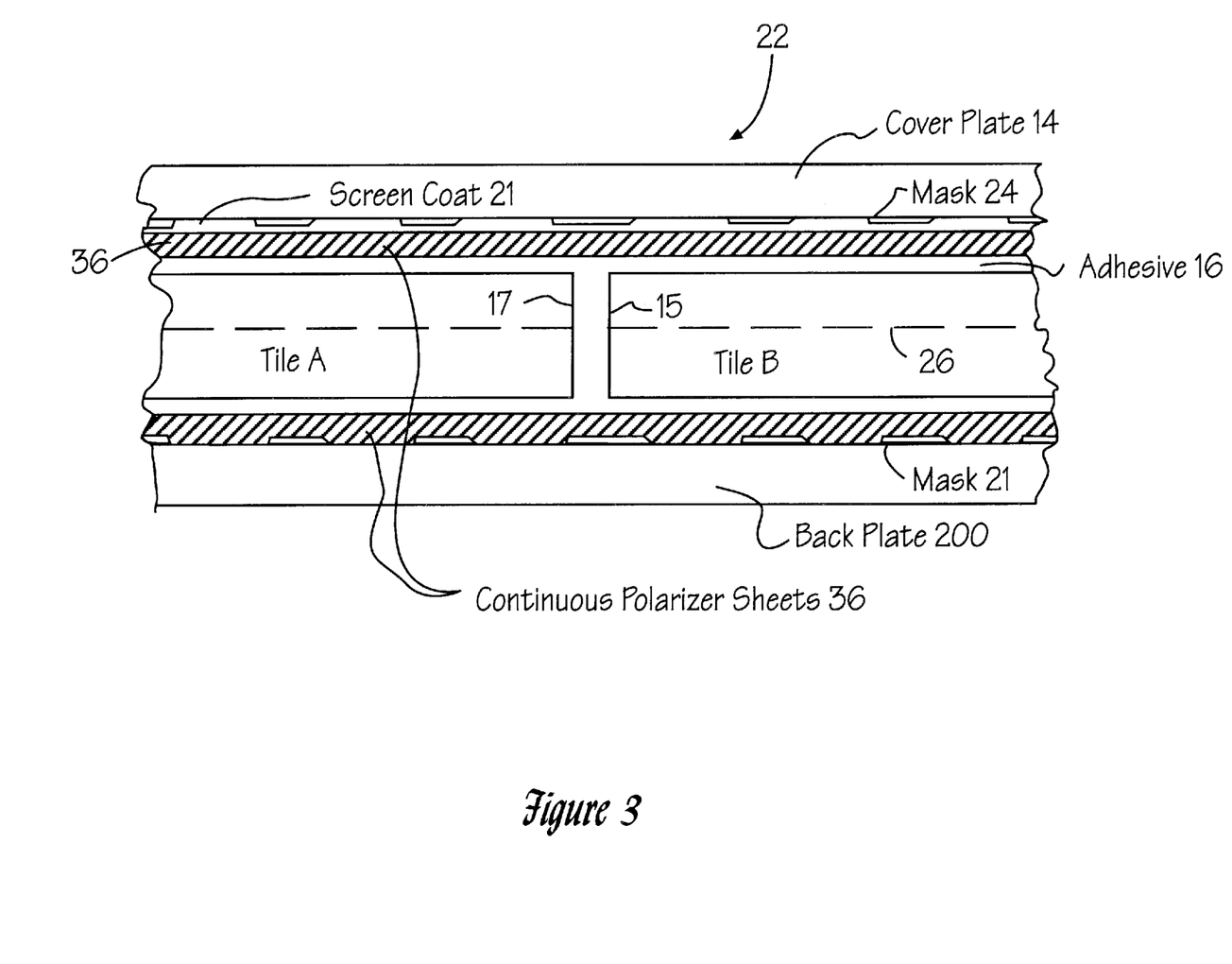
FIG. 3 illustrates a sectional view of the tiled display of the prior art fabricated with continuous polarizer sheets.

FIG. 3 shows a fabrication using continuous polarizer sheets 36 in conjunction with a tiled display made in a fashion known in the prior art. The continuous polarizers 36 provide the benefits stated hereinabove for any fabrication of tiled flat-panel LCD displays.

Another method of producing the inventive display 30 is to add thin spacers, or adhesive layers (not shown), to the tiles prior to the display's assembly, so that tiles can be nested during assembly processing of the display.

Yet another method of this invention entails building tiles having different top glass thicknesses (e.g., 0.5 mm and 0.7 mm).

Still another embodiment involving the vertical shift and subsequent overlapping of the chrome mask 26 is possible. For instance, the vertical shift could be reduced to 0.1 mm, which would permit a 0.275 mm distance between the aperture edge and the tile edge. This results in a viewing angle of only 74 degrees (37 degrees off normal), however; horizontal tolerances would thus be decreased. The viewing angle can be further increased by blocking the tile gap between the chrome masks with an opaque, black material (such as paint, tape, caulk, sealant, etc.). It is also possible to overlap the tiles by four pixels, resulting in more overlap and a larger viewing angle.

As shown in FIG. 2 there is no direct channel for vertical light transmission along the seam F between tiles. Light can be transmitted only directly along the tile edges at the angle of the bevel, which is chosen to be beyond the normal viewing angle of the display.

Precisely cutting tiles and polishing the bevelled edges can be accomplished, respectively, by using a dicing saw, by scribe and break, and by lapping and/or grinding. These processes are well known in the semiconductor and optics industries.

The construction techniques described herein are also applicable to a projector-type, tiled display with masks as described in the aforementioned patent application, Ser. No. 08/593,759. This construction yields an increased seal region and results in blocking from the viewer most of the light from the backlight impinging on the seam region. For certain applications, all of the unwanted light in the seam region can be blocked and the tile edges hidden by masks, in accordance with this invention.

A projector-type, tiled display using collimated light and a diffusion screen without masks can be fabricated to improve the image consistency at all viewing angles within the allowable range of the bevelled edges. This type of fabrication is desirable when the size of the display is large enough to exhibit image inconsistency due to the viewing angle range needed to view the span of an image by an observer. The display, without masks, is not totally "seamless" in that the bevelled edges will still be visible at the angle of the bevel.

Tolerances associated with locating tiles relative to each other, accompanied with the use of masks, collimated light, and diffusing projection screens for tiled flat-panel displays, can sometimes cause color shifts between tiles. This invention includes pixel designs that eliminate the color shifts arising from tile-to-mask registration errors.

Figure 4A:
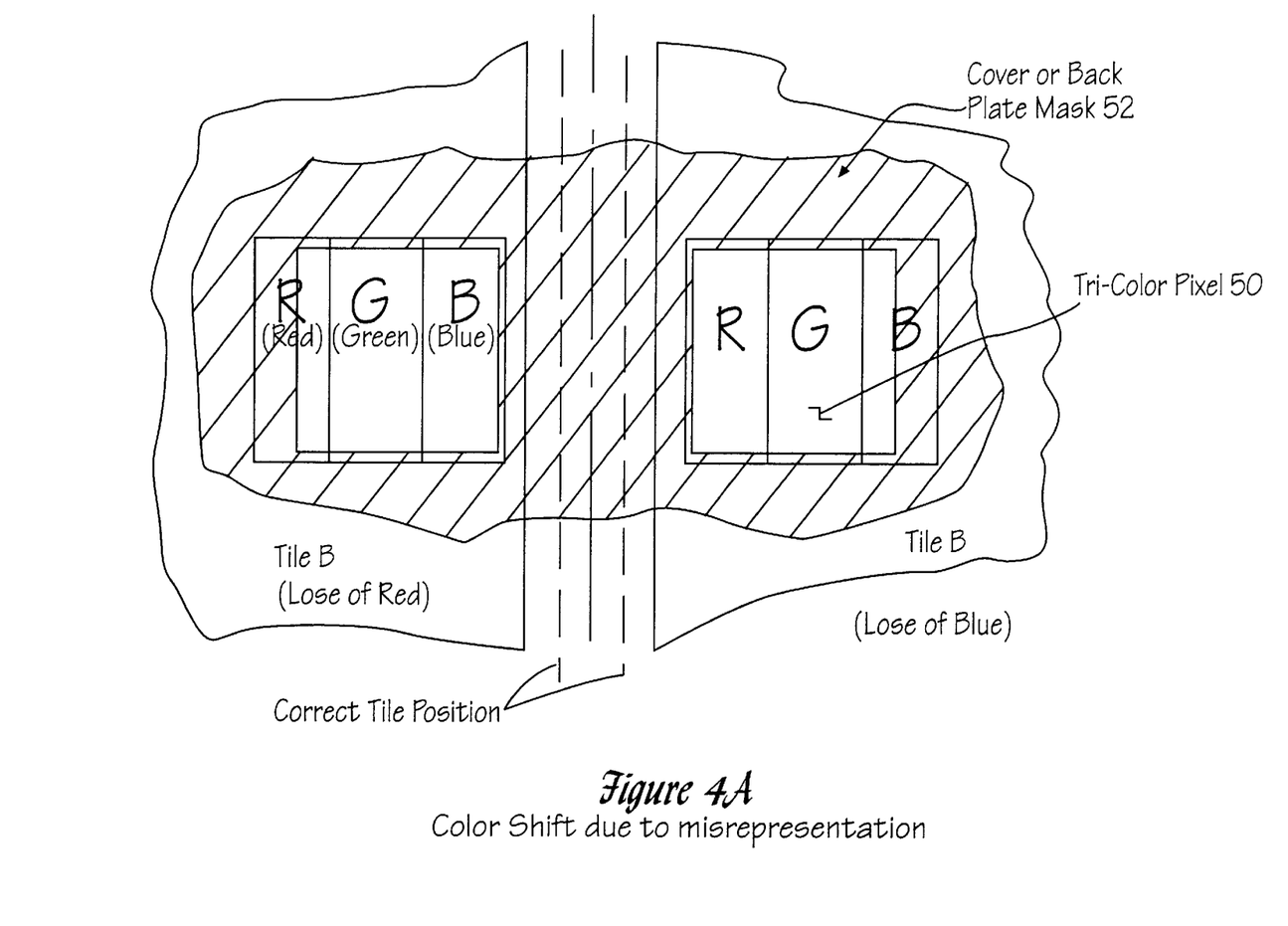
FIGS. 4a–4d illustrate several pixel geometries resulting in improved color purity for tiled, flat-panel displays which use masks and collimated light to conceal the seams.

FIG. 4a depicts the relative misregistration between a tri-color pixel 50 and corresponding mask 52. Pixels for color displays are typically constructed from the three primary additive colors, red, blue and green, and are referred to as RGB pixels. The color shift of the tile occurs when some of the light is blocked in the "X" direction; in this example some of the red is blocked, so the red intensity is reduced, giving a blue tint to the tile composite color. If the horizontal misregistration occurs in the opposite direction, the blue intensity would be reduced and the tile would have a red tint. Therefore, adjacent tiles can have distinctly different color tints due to display assembly tolerances. When the misalignment occurs in the vertical direction only, the light intensity is decreased, since the three colors combine to form white and they are each reduced the same amount.

Figure 4B:
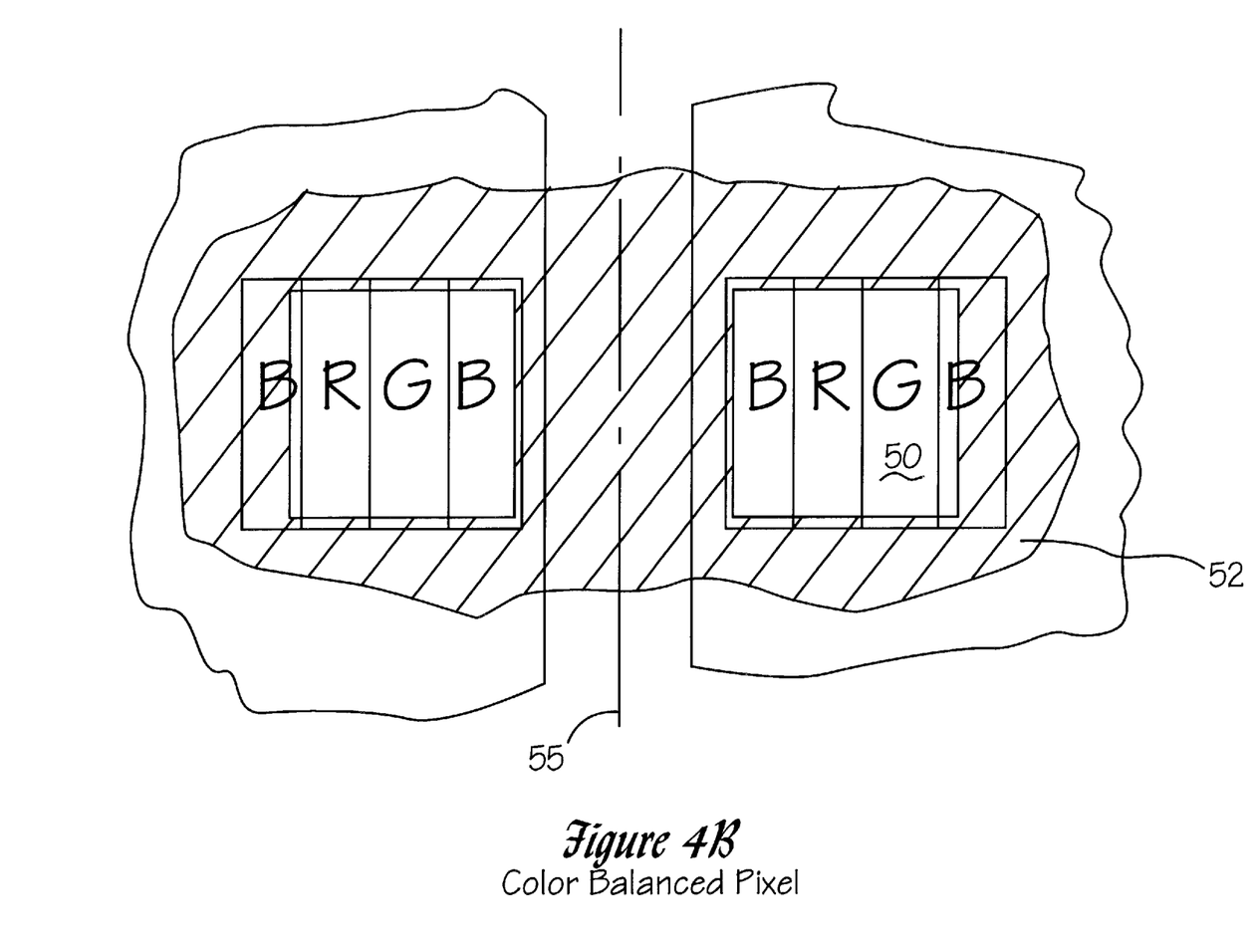

FIG. 4b shows the preferred pixel design of this invention. The pixel color deployment is symmetric about the vertical centerline 55 of the pixel. When a misregistration occurs between the pixel 50 and mask 52, the blue intensity is reduced on the right side and increased on the left side, thereby maintaining the color purity of the tile. The exposure of light through the mask always illuminates the same area of blue in the pixel. In practice, the mask opening is larger than the pixel for manufacturing reasons and the collimated light is somewhat divergent. However, the color purity can still be maintained.

Figure 4C:
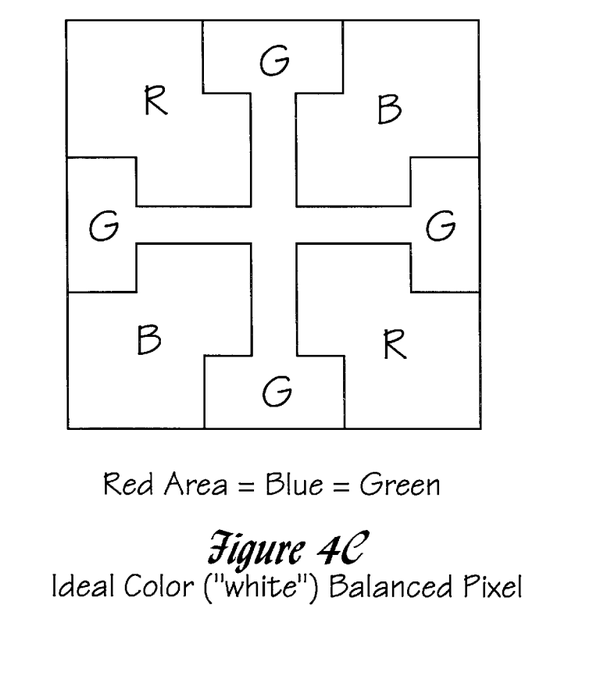

FIG. 4c depicts an example of an ideal pixel design which maintains the tile color purity in a unique manner. There is no color change when mask-to-pixel misregistration occurs in any direction. The light intensity will decrease somewhat with misregistration, but the color will always be pure "white".

Figure 4D:
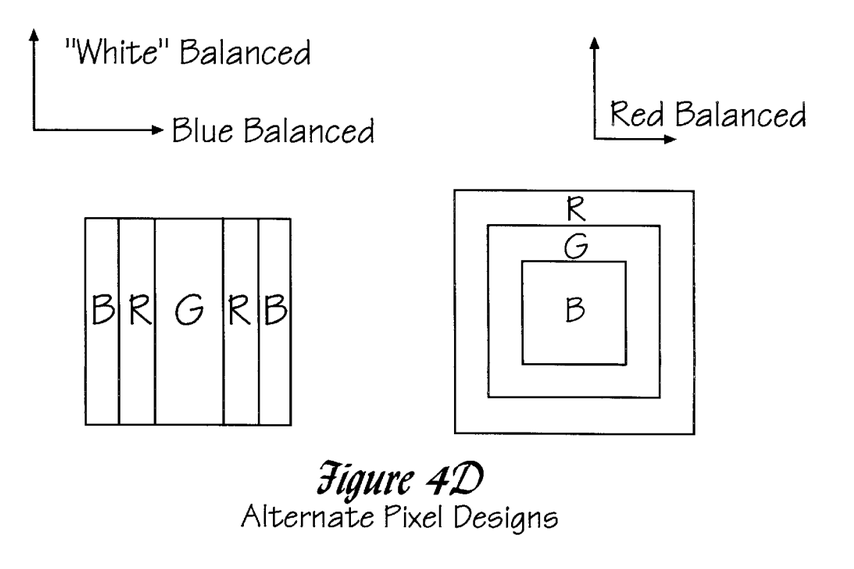

FIG. 4d depicts other examples of pixel designs for which color shifts due to mask-to-pixel misregistration are eliminated. It is obvious to those skilled in the art that many other tri-color pixel geometries can be formulated to eliminate these color shifts present in tiled displays with masks.

Several desirable features of this invention over displays of the prior art include: (1) eliminating the need for exterior masks; (2) eliminating the requirement for collimated light, as well as an associated screen; (3) continuous polarizer sheets 36 to help conceal the seams; (4) light utilized more efficiently; (5) tolerance relaxation in the assembly process; (6) increased yields; (7) an additional flexibility in design exists, which allows for reduced costs, as well as the potential usage of many more types of tile from different manufacturing sources; (8) resultant, wide seal region for the same pixel pitch; and (9) methods of designing tri-color pixels to eliminate color shifts in tiled displays.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of fabricating a tiled, substantially flat, panel display having improved light efficiency and a monolithic seamless appearance, comprising the steps of:

a) preparing tiles so that the edges thereof are at and angle with respect to a vertical plane;

b) shifting said tiles in said vertical plane, while maintaining pixel or aperture spacing of said flat-panel display in a horizontal plane; and c) bonding said tiles together during assembly with a refractive-index-matching adhesive.

2. The method of fabricating a tiled, substantially flat, panel display in accordance with claim 1, wherein said display comprises an aperture mask blocking portions of said tiles and having apertures leaving display portions of said tiles unblocked and said tiles comprise pixel regions, and further wherein a distance from a center of a pixel nearest an edge to an aperture in the aperture mask is greater in length than one-half of a pixel length.

3. The method of fabricating a tiled, substantially flat, panel display in accordance with claim 1, wherein said refractive-index-matching adhesive comprises a low elastic modulus material.

4. The method of fabricating a tiled, substantially flat, panel display in accordance with claim 1, wherein, compared to a minimum gap distance between adjacent tiles cut vertically, a larger space is provided for sealing said tiles.

5. The method of fabricating a tiled, substantially flat, panel display in accordance with claim 1, wherein, compared to a minimum gap distance between adjacent tiles cut vertically, a larger opening of an aperture of said display is provided.

6. The method of fabricating a tiled, substantially flat, panel display in accordance with claim 1, further comprising the step of:

d) adding spacers to said tiles so that said tiles can be nested with respect to each other on a plane during assembly.

7. The method of fabricating a tiled, substantially flat, panel display in accordance with claim 1, further comprising the step of:

d) adding adhesive layers to said tiles, so that said tiles can be nested with respect to each other during assembly.

8. A substantially flat, panel display having improved light efficiency and a monolithic seamless appearance, comprising tiles bonded adjacent each other, with at least two adjacent tiles having edges that are cut so as to be disposed at an angle with respect to a vertical plane, said tiles being shifted with respect to each other in said vertical plane and bonded together with a refractive-index-matching adhesive.

9. The substantially flat, panel display in accordance with claim 8, further comprising at least one aperture mask blocking portions of said tiles and having apertures leaving display portions of said tiles unblocked, and wherein said tiles comprise pixel regions, and further wherein a distance from a center of a pixel nearest a cut edge to an aperture in said at least one aperture mask is greater in length than one-half of a pixel length.

10. The substantially flat, panel display in accordance with claim 8, wherein, compared to a minimum gap distance between adjacent tiles cut vertically, a larger space is provided for sealing said tiles.

11. The substantially seamless, substantially flat, panel display in accordance with claim 8, wherein, compared to a minimum gap distance between adjacent tiles cut vertically, a larger opening of an aperture of said display is provided.

12. The substantially flat, panel display in accordance with claim 8, wherein, compared to a minimum gap distance between adjacent tiles cut vertically, a smaller spacing of aperture openings of said display is provided.

13. The substantially flat, panel display in accordance with claim 8, further comprising spacers added thereto, and wherein said tiles are nested with respect to each other.

14. The substantially flat, panel display in accordance with claim 8, further comprising adhesive layers added thereto, and wherein said tiles are nested with respect to each other.

15. The substantially flat, panel display in accordance with claim 9, wherein at least two aperture masks overlap when viewed on a normal of said substantially flat, panel display.

16. The substantially flat, panel display in accordance with claim 9, wherein at least two chrome masks appear continuous, when viewed on a normal of said substantially flat, panel display.

17. A substantially seamless, substantially flat, panel display having improved light efficiency, comprising tiles bonded adjacent each other, with at least two adjacent tiles having edges that are cut, disposed at an angle with respect to a vertical plane, said tiles being bonded together with a refractive-index-matching adhesive, said tiles comprising pixel regions and said tiles being shifted so as to maintain pixel spacing in a horizontal plane.

18. The substantially seamless, substantially flat, panel display in accordance with claim 17, further comprising at least one aperture mask blocking portions of said tiles and having apertures leaving display portions of said tiles unblocked, and wherein a distance from a center of a pixel region nearest a cut edge to an aperture in said at least one aperture mask is approximately greater in length than one-half of a pixel length.

19. The substantially seamless, substantially flat, panel display in accordance with claim 17, wherein said polarizing means includes a polarizer sheet disposed on at least one of said adjacent opposite surfaces of said tiles.

20. The substantially seamless, substantially flat, panel display in accordance with claim 17, wherein said polarizing means includes two continuous, full width, polarizer sheets disposed on at least one of said adjacent opposite surfaces of said tiles.

21. The substantially seamless, substantially flat, tiled, panel display in accordance with claim 17, further comprising a screen for providing increased viewing angle and increased color purity when illuminated with collimated light.

22. The substantially seamless, substantially flat, tiled, panel display in accordance with claim 21, further comprising an additional aperture mask disposed adjacent one of said polarizer sheets and disposed above said edges of said cut tiles.

23. The substantially seamless, substantially flat, panel display in accordance with claim 22, further comprising color balanced pixel geometry for maintaining color purity between tiles.

24. The substantially seamless, substantially flat, panel display in accordance with claim 23, wherein said color balanced pixel geometry maintains color purity in one direction by situating a predetermined primary color on all of the outer edges of the pixel.

25. The substantially seamless, substantially flat, panel display in accordance with claim 23, wherein said color balanced pixel geometry maintains color purity in two directions by situating a predetermined primary color on all of the outer edges of the pixel.

26. The substantially seamless, substantially flat, panel display in accordance with claim 23, wherein said color balanced pixel geometry maintains color purity in all directions by situating a predetermined primary color on all of the outer edges of the pixel.

27. The substantially seamless, substantially flat, panel display in accordance with claim 16, wherein said refractive-index-matching adhesive comprises a low elastic modulus material.

* * * * *